United States Patent
Mosher

(10) Patent No.: US 9,044,027 B2
(45) Date of Patent: Jun. 2, 2015

(54) METHOD AND APPARATUS FOR THE EUTHANASIA OF ANIMALS

(75) Inventor: Howard E. Mosher, Killingworth, CT (US)

(73) Assignee: EUTHANEX CORPORATION, Allentown, PA (US)

( * ) Notice: Subject to any disclaimer, the term of this patent is extended or adjusted under 35 U.S.C. 154(b) by 887 days.

(21) Appl. No.: 11/301,146

(22) Filed: Dec. 12, 2005

(65) Prior Publication Data

US 2006/0086038 A1    Apr. 27, 2006

Related U.S. Application Data

(63) Continuation-in-part of application No. 10/957,789, filed on Oct. 4, 2004, now abandoned.

(60) Provisional application No. 60/510,280, filed on Oct. 10, 2003.

(51) Int. Cl.
  *A61M 11/00* (2006.01)
  *A22B 3/00* (2006.01)

(52) U.S. Cl.
  CPC .. *A22B 3/005* (2013.01); *A22B 3/00* (2013.01)

(58) Field of Classification Search
  USPC ............. 128/203.12, 203.14, 203.15, 203.25, 128/204.18, 204.21, 205.11, 205.26
  See application file for complete search history.

(56) References Cited

U.S. PATENT DOCUMENTS

| | | | |
|---|---|---|---|
| 1,849,194 A | 3/1932 | McCurrie | |
| 2,064,822 A | 12/1936 | Cramer et al. | |
| 2,172,768 A | 9/1939 | Liston | |
| 3,356,087 A | 12/1967 | Guttman | |
| 4,107,818 A | 8/1978 | Scott et al. | |
| 4,807,615 A * | 2/1989 | Nakagawa et al. | 128/203.12 |
| 4,941,431 A | 7/1990 | Anderson et al. | |
| 5,584,139 A | 12/1996 | Wentworth | |
| 5,752,506 A * | 5/1998 | Richardson | 128/204.18 |
| 6,352,076 B1 * | 3/2002 | French | 128/203.12 |
| 6,776,158 B1 | 8/2004 | Anderson et al. | |
| 6,881,607 B2 * | 4/2005 | Farnworth | 438/106 |
| 7,377,276 B2 * | 5/2008 | Roy et al. | 128/203.14 |
| 7,503,323 B2 * | 3/2009 | Dalgetty et al. | 128/203.15 |
| 2002/0017301 A1 * | 2/2002 | Lundin | 128/205.24 |
| 2002/0103443 A1 * | 8/2002 | Roy et al. | 600/532 |
| 2005/0022808 A1 | 2/2005 | Caplette | |

OTHER PUBLICATIONS

Automatic Timing Controls Inc. Model 765 website information.*

* cited by examiner

*Primary Examiner* — Steven Douglas

(74) *Attorney, Agent, or Firm* — Stephen H. Eland; Dann, Dorfman, Herrell & Skillman

(57) ABSTRACT

A method and apparatus for the humane euthanasia of small animals involves the use of a programmable controller and animal holding chamber. The apparatus includes a Mass Flow Controller ("MFC") having a closed-loop interface with a Programmable Logic Controller ("PLC") to provide a predetermined flow rate of gas under specified pressures for specified time periods. The PLC is preprogrammed to provide various cycles that are designed to provide the proper flow rate for various animal species. The program may allow for a two-stage flow rate cycle so that in the first stage the animal is anesthetized and in the second stage the animals are euthanatized.

49 Claims, 2 Drawing Sheets

METHOD AND APPARATUS FOR THE EUTHANASIA OF ANIMALS

CROSS REFERENCE TO RELATED APPLICATIONS

This non-provisional application claims priority, as a continuation-in-part, from U.S. application Ser. No. 10/957,789 filed Oct. 4, 2004, now abandoned which claims priority from U.S. Provisional Application Ser. No. 60/510,280 filed Oct. 10, 2003, which applications are hereby incorporated by reference in their entirety.

FIELD OF THE INVENTION

This invention relates to a method and apparatus for the euthanasia of animals. The invention involves a gaseous euthanasia apparatus comprising a programmed controller and chamber.

BACKGROUND OF THE INVENTION

Small animal, particularly rodent, euthanasia is commonly performed by placing the animals in a chamber that is connected to a carbon dioxide tank and allowing the gas to flow until the animals are euthanatized as measured by cessation of heartbeat and respiration.

It is commonly accepted that euthanasia of animals should be conducted effectively in a painless manner and without causing excessive excitation of the animal. Various methods of euthanasia have been described in the literature. The methods include mechanical and electrical means as well as inhalation of gases and administration of anesthetic fluids. For example, see Vet. Rec. 116, 416 (1985) and Comp. Med. 53(3) 249-257 (2002).

Gas inhalation has been endorsed as the most efficient way of euthanizing large numbers of small animals, including but not limited to rodents, such as mice, rats, guinea pigs, and others. Carbon dioxide is the most widely used gas for euthanasia of rodents and is on the list of acceptable agents recommended by the American Veterinary Medical Association (AVMA) as described in J. Am. Vet. Med. 202(2): 229-249 (1996).

Despite the fact that carbon dioxide is widely used for rodent euthanasia, questions have arisen regarding its use for humane euthanasia because of alleged concerns that asphyxiation or hypoxia may precede anesthesia as described in Lab. Anim. 223:220-228 (1989). According to the AVMA, the suitability of a method or apparatus for euthanasia depends on whether an animal experiences distress between the time it begins to inhale the euthanisizing agent and the time it loses consciousness.

Distress is an aversive state in which the animal is unable to adapt to stressors and the resulting distress presents as maladaptive behaviors exemplified but not limited to struggling, attempts to escape, salivation, urination and reflex muscle contractions such as tremors, shivers and spasms.

Due to lack of automation and operator error prior art processes lack standardization and compliance with the Animal Welfare Act. Despite the widespread use of carbon dioxide in the euthanasia of laboratory animal species, considerable controversy exists concerning whether distress is associated with carbon dioxide induction, as studies have produced contradictory results as to whether a high level of distress was experienced by rodents prior to loss of consciousness. Another area of controversy is whether the stress level of the animal is increased if the chamber is pre-filled or post-filled with gas before the process is initiated.

Based on the foregoing, it is an objective of the present invention to provide a method of and apparatus for gaseous euthanasia of animals which is humane, painless and does not induce fear or apprehension in the animal. It is a further objective that the method and apparatus be reliable, cost-effective, provide a high standard of compliance for the operator, and be safe and easy to operate. The device of the present invention advantageously minimizes operator input as to gas flow rates and times and actual handling of the animals themselves resulting in the reduction of operational and compliance issues.

SUMMARY OF THE INVENTION

The present invention is directed to an apparatus for the euthanasia of animals using a euthanitizing gas. The apparatus may include a programmed controller pre-programmed to provide multiple schedules of instructions to initiate and implement conrtrols to the flow of the euthanitizing gas, a mass flow controller configured to be flow coupled to a source of the euthanitizing gas, and a first animal holding chamber flow coupled to the mass flow controller. A second animal holding chamber may be flow coupled to the mass flow controller.

In certain embodiments, the programmed controller may be configured to send signals to, and receive signals from, the mass flow controller. The programmed controller may be pre-programmed to control a flow rate of the euthanitizing gas into the first animal holding chamber. The programmed controller may also be pre-programmed to control the flow rate of the euthanitizing gas into the first animal holding chamber such that a lower flow rate precedes a higher flow rate. The programmed controller may further be pre-programmed to control the flow rate of the euthanitizing gas into the first animal holding chamber such that the flow rate changes as a function of time.

In other embodiments, a supply valve may be included and one of the multiple schedules may be pre-programmed to stop the flow of the euthanitizing gas from entering the mass flow controller. The supply valve may be located upstream of the mass flow controller. A first chamber valve may be included and the schedule may be pre-programmed to stop the flow of the euthanitizing gas from entering the first animal holding chamber. The first chamber valve may be located downstream of the mass flow controller and upstream of the first animal holding chamber. A first purge valve may be included and configured to stop the flow of the euthanitizing gas exiting the first animal holding chamber. The first purge valve may be located downstream of the first animal holding chamber. A first pressure release valve may be included and configured to stop the flow of the euthanitizing gas from exiting the first animal holding chamber. The first pressure release valve may be located downstream of the first animal holding chamber. The supply valve and/or the purge valve may be solenoid valves. The operation of these solenoid valves may be controlled by the programmed controller.

In a further embodiment, the first animal holding chamber may include a locking latch and a locking latch sensor. In one aspect, the programmed controller may be pre-programmed to receive a signal from the locking latch sensor.

In another embodiment, the programmed controller may be programmable. In one aspect, the programmed controller may be protected from unauthorized programming. Further, in other aspects, the programmed controller may include programmed instructions for euthanitizing more than one type of animal, programmed instructions for controlling the flow of the euthanitizing gas into more than one size of animal holding chamber, and/or programmed instructions for utilizing a euthanitizing gas having a carbon dioxide component.

The programmed controller may be pre-programmed to control a first flow rate of the euthanitizing gas into the first animal holding chamber and a second flow rate of the euthanitizing gas into the second animal holding chamber. Optionally, the programmed controller may be pre-programmed to control the first and second flow rates such that the first rate changes as a first function of time and the second flow rate changes as a second function of time. The programmed controller may also be pre-programmed to control the first and second flow rates such that the first flow rate is zero when the second flow rate is non-zero.

In even a further embodiment, a first chamber valve may be configured to stop the flow of the euthanitizing gas from entering the first animal holding chamber, this first chamber valve being located downstream of the mass flow controller and upstream of the first animal holding chamber, and a second chamber valve may be configured to stop the flow of the euthanitizing gas from entering the second animal holding chamber, this second chamber valve being located downstream of the mass flow controller and upstream of the second animal holding chamber. In another aspect, a first purge valve may be configured to stop the flow of the euthanitizing gas from exiting the first animal holding chamber, this first purge valve being located downstream of the first animal holding chamber, and a second purge valve may be configured to stop the flow of the euthanitizing gas from exiting the second animal holding chamber, this-second purge valve being located downstream of the second animal holding chamber. In even another aspect, a first pressure release valve may be configured to stop the flow of the euthanitizing gas from exiting the first animal holding chamber, this first pressure release valve being located downstream of said first animal holding chamber, and a second pressure release valve may be configured to stop the flow of the euthanitizing gas from exiting the second animal holding chamber, this second pressure release valve being located downstream of the second animal holding chamber. The supply valve, the first and second chamber valves, and/or the first and second purge valves may be solenoid valves. The solenoid valves may be controlled by the programmed controller.

In another embodiment, an apparatus for the euthanasia of animals using a euthanitizing gas includes a mass flow controller flow configured to be coupled to a supply source of the euthanitizing gas, a programmed controller to initiate a flow of the euthanitizing gas, and a transport vehicle, wherein the programmed controller and the mass flow controller are mounted on the transport vehicle. A first animal holding chamber may be flow coupled to the mass flow controller and mounted on the transport vehicle or mounted on a second transport vehicle. The supply source of the euthanitizing gas may be mounted on the transport vehicle.

In even another embodiment, a method for the euthanasia of animals is provided. This method utilizes an apparatus having a programmed controller storing at least a first flow rate schedule for supplying euthanitizing gas, a mass flow controller flow coupled to a source of a euthanitizing gas, and at least a first animal holding chamber flow coupled to the mass flow controller, the first animal holding chamber holding animals. The method includes selecting a first flow rate schedule of euthanitizing gas flow, initiating a first flow of euthanitizing gas according to the first flow rate schedule into the first animal holding chamber, and controlling a first flow rate of euthanitizing gas according to the first flow rate schedule into the first animal holding chamber. IN one aspect, controlling the first flow rate of euthanitizing gas may include sending a signal from the programmed controller to the mass flow controller. In another aspect, controlling the first flow rate of euthanitizing gas may further include sending a signal from the mass flow controller to the programmed controller.

The method may further include selecting a second flow rate schedule of euthanitizing gas flow, initiating a second flow of euthanitizing gas according to the second flow rate schedule into a second animal holding chamber, and controlling a second flow rate of euthanitizing gas according to the second flow rate schedule into the second animal holding chamber. In one aspect, controlling the first flow rate of euthanitizing gas into the first animal holding chamber may occur at least partially concurrently with controlling the second flow rate of euthanitizing gas into the second animal holding chamber. The first flow rate may vary as a function of time. Further, prior to initiating the first flow of euthanitizing gas, the programmed controller may receive a signal that indicates that the first animal holding chamber is closed.

These and other objects, features and advantages of the present invention will become apparent in light of the drawings and detailed description of various embodiments of the present invention provided below.

DETAILED DESCRIPTION OF PREFERRED EMBODIMENTS

Figure 1:
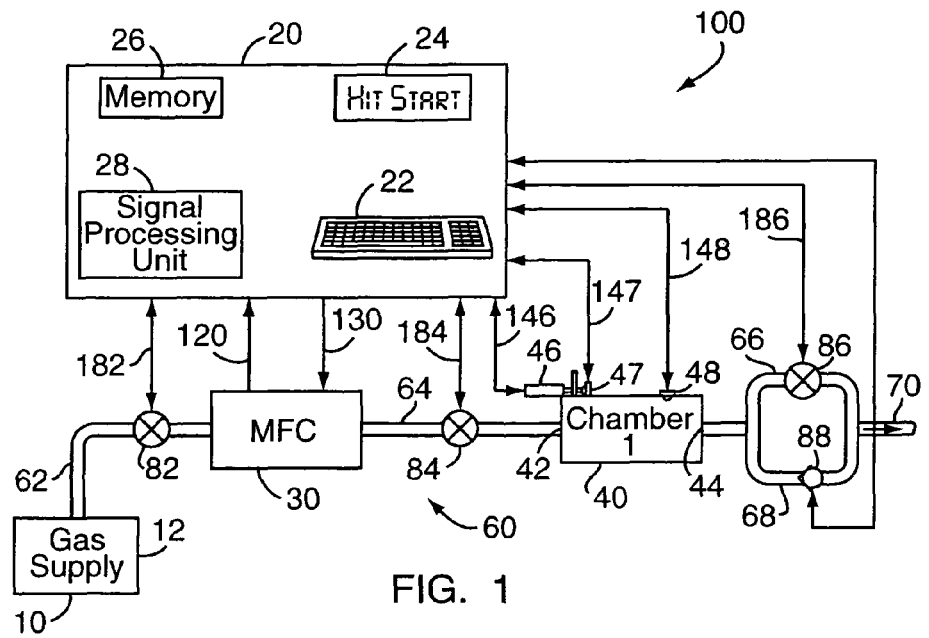
FIG. 1 is a schematic representation of one embodiment of the apparatus of the present invention.
Figure 2:
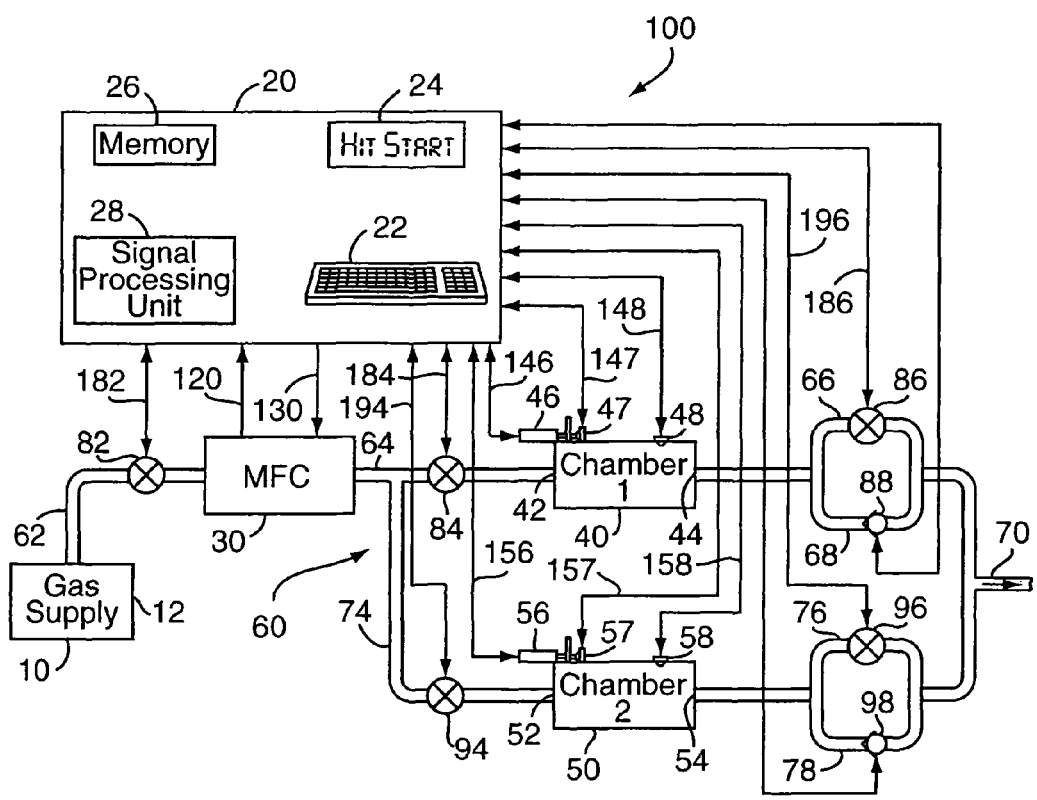
FIG. 2 is a schematic representation of another embodiment of the apparatus of the present invention.

Apparatus 100 is provided to humanely euthanitize small animals. Referring to FIG. 1, apparatus 100 includes a programmable logic controller (PLC) 20, a mass flow controller (MFC) 30 and at least a first animal holding chamber 40. In one embodiment, apparatus 100 may include more than one animal holding chamber. For example, as shown in FIG. 2, a second animal holding chamber 50 is provided. During operation, apparatus 100 is flow coupled to a gas supply system 10 and a gas evacuation system 70 via gas flow distribution system 60.

Gas supply system 10 may include one or more pressurized gas cylinders 12. Alternatively, gas supply system 10 may include a distributed gas supply piped into the building or room in which apparatus 100 is located. Gas supply system 10 may supply any suitable gas for euthanitizing small animals. As a non-limiting example, gas supply system 10 may supply carbon dioxide ($CO_2$) from a cylinder pressurized to 20 psi. As other non-limiting examples, gas supply system 10 may supply other euthanitizing gases such as argon, argon blends and/or carbon dioxide: oxygen mixtures.

Gas evacuation system 70 may include, by way of non-limiting example, a building vacuum system. Alternatively, or in addition to a building-wide vacuum system, gas evacuation system 70 may include a pump that pulls the euthanitizing gas from the holding chamber. The pump may, for example, vent to outside the building or to a recycle chamber. Alternatively, in its simplest form, gas evacuation system 70 may simply be a vent to the ambient atmosphere. This simplest gas evacuation system may be most applicable when the euthanitizing gas is pressurized within the holding chamber, when the gas sinks relative to atmosphere, and/or when the euthanitizing gas is not toxic to the operators in the quantities that are evacuated.

Programmed logic controller (PLC) 20 includes one or more operator input interfaces 22, operator output interfaces 24, and memory storage devices 26. Additionally, PLC 20 may include electronic signal processing units 28. Operator input interface 22 may include a keyboard, keypad, touch screen, mouse, microphone or any other device that allows a supervisor to input multiple schedules of instructions and/or commands into PLC 20. As a non-limiting example, a typical operator input may be to type in a code identifying the type of animal to be euthanitized (i.e. mouse, rat, chick, etc.). Other typical inputs may include selecting or identifying the chamber within which the animals are placed by pressing a button or typing in a code, starting the euthanitizing cycle, or responding to queries from PLC 20. Operator output interface 24 may include a graphical display screen, speakers, LED's, counters or any other device that provides information regarding the status of the euthanitizing operation to the operator. Non-limiting examples of such operator output interfaces may include a graphical text message requesting a specific operator input, a flashing light indicating the status of a pre-selected sensor, or a buzzer providing a warning or indicating cycle completion, for instance.

PLC 20 may include one or more memory storage devices 26 for storing one or more programs or sets of instructions for controlling different aspects of apparatus 100 during the euthanasia process. Memory storage devices 26 may be permanently installed or removable, and may include as non-limiting examples, computer discs or other electromagnetic memory storage devices. Programmed instructions may relate to accepting input from operator input interface 22, providing output to operator output interface, 24, sending or receiving signals from MFC 30, receiving sensor inputs via signal processing units 28, and/or controlling motors and switches. In addition to being programmed, i.e. having multiple schedules of instructions residing in its memory, PLC 20 may also be programmable by a supervisor, i.e. capable of receiving a new schedule of instructions and storing these instructions in memory or capable of modifying a schedule of instructions already stored in memory.

PLC 20 may also include signal processing units 28. For example, a pressure sensor may send an analog signal to a pressure sensor signal processing unit which may convert the analog signal to a digital signal.

Mass flow controller (MFC) 30 regulates the flow rate of gas supplied to the animal holding chambers from the gas supply system 10. MFC 30 is flow coupled to gas flow distribution system 60. In one embodiment, gas enters MFC 30 from gas supply system 10 via gas supply line 62 and gas exits MFC 30 to enter animal holding chamber 40 via chamber supply line 64. In one aspect, MFC 30 may be a standardized mass flow controller. By way of non-limiting examples, MFC 30 may be a Dwyer, series GFC or an Aalborg mass flow controller.

MFC 30 receives control signals from PLC 20 via MFC control line 130. These control signals indicate the desired gas flow rates for different times in the euthanasia cycles. These desire flow rates may be referred to as flow rate schedules. For a single-stage flow rate euthanasia cycle, MFC 30 could, for example, receive a desired flow rate signal from PLC 20 at the beginning of the gas supply stage of the euthanasia cycle. Pressure, flow and/or temperature sensors within MFC 30 may be used to measure the actual gas flow rate through MFC 30. Signals from these internal sensors may be sent from MFC 30 to PLC 20 via feedback control line 120.

PLC 20 may then modify the flow rate control signal sent to MFC 30 to accommodate any undesirable variation or fluctuation in the measured gas flow rate. Thus, in this embodiment, PLC 20 and MFC 30 are part of a closed-loop feedback system to accurately monitor and control the actual gas flow rate. For a two-stage flow rate euthanasia cycle, PLC 20 could send a first desired flow rate signal to MFC 30 at the beginning of the first stage (typically, an anesthetizing stage) and then send a second desired flow rate signal at the beginning of the second stage (typically, the termination stage). These desired flow rate schedules could be tailored for the various animals being euthanitized, the specific euthanitizing gas being supplied, the pressure of the euthanitizing gas, the size of the animal holding chamber, and any other variables that could affect the euthanitizing operation. Furthermore, the desired flow rate signal sent from PLC 20 to MFC 30 need not be a constant signal value, but could ramp up or down during a portion of the flow cycle pursuant to a predetermined schedule or depending upon feedback received from the MFC internal sensors.

Animal holding chamber 40 is designed to hold one or more small animals during the euthanitizing process. In one embodiment, animal holding chamber includes four sides, a bottom and a top and is made of acrylic and/or polycarbonate material. The top may be a movable lid that opens and closes to allow for insertion and removal of the animals. In one aspect, animal holding chamber 40 is leak tight when the lid is closed. In another aspect, animal holding chamber 40 includes a locking latch 46 that assists in sealingly closing holding chamber 40 and/or inhibits the opening of holding chamber 40. Locking latch 46 may be manually operated or, alternatively, locking latch 46 may be electrically, magnetically, pneumatically or hydraulically actuated. Locking latch 46 may be opened or closed upon receiving an opening or closing signal from PLC 20 via locking latch control line 146. In a further aspect, a locking latch sensor 47 may send a signal to PLC 20 via locking latch sensor control line 147 that provides an indication as to whether or not holding chamber 40 is closed and locked with locking latch 46. By way of non-limiting example, locking latch 46 may include a 24 VDC switch and a 24 VDC solenoid pin to lock shut chamber lid. It is desirable that locking latch 46 be engaged during the portion of the operation when gas is flowing into the holding chamber and when the animals are being euthanitized. When the euthanitizing gas is being evacuated from the chamber, it is desirable that the locking latch be disengaged such that air may flow into the chamber thereby preventing a vacuum from being formed with the chamber.

In even a further aspect, a chamber pressure sensor 48 may be provided. Chamber pressure sensor 48 may send a signal to PLC 20 via chamber pressure sensor control line 148 indicating the pressure within chamber 40. Should chamber pressure signal 48 indicated that pressure within chamber 40 exceeds a specified upper limit, PLC 20 could, for example, cause the flow of gas into chamber 40 to be stopped or the gas from the chamber to be evacuated.

Animal holding chamber 40 is flow coupled to gas flow distribution system 60 downstream of MFC 30. Specifically, euthanitizing gas from MFC 30 flows into holding chamber 40 via gas supply port 42 and chamber supply line 64. Euthanitizing gas exits holding chamber 40 via gas exit port 44 and first chamber gas evacuation line 66. First chamber gas evacuation line 66 is flow coupled to gas evacuation system 70.

In an alternative embodiment, a first chamber gas purge line 68 may be provided between holding chamber 40 and gas evacuation system 70. First chamber gas purge line 68 may be installed in parallel with first chamber evacuation line 66.

Apparatus 100 may also include one or more valves as part of gas flow distribution system 60 to further assist in controlling the flow of gas through apparatus 100. In one embodiment, a supply valve 82 may be flow coupled to gas supply line 62 and used to control the flow of gas from gas supply system 10 to MFC 30. Although supply valve 82 may be manually controlled, in a preferred embodiment, supply valve 82 is controlled by PLC 20 via valve control line 182. Supply valve 82 may be a solenoid valve. Furthermore, supply valve 82 may also provide signals to PLC 20, also via valve control line 182, regarding the open or closed status of valve 82 or its degree of opening or closing. A second valve, evacuation valve 86 may be flow coupled to first gas evacuation line 66 to control the flow of gas from holding chamber 40 to gas evacuation system 70. Evacuation valve 86 is controlled by PLC 20 via valve control line 186. As with supply valve 82, evacuation valve 86 may be a solenoid valve. Furthermore, evacuation or purge valve 86 may also provide signals to PLC 20, also via valve control line 186, regarding the open or closed status of valve 86 or its degree of opening or closing. A third valve, pressure release valve 88 may be flow coupled to first chamber gas pressure release line 68 to provide a pressure release safety mechanism to prevent excessive pressure in holding chamber 40. In one aspect, pressure release valve 88 may be a spring-loaded check valve.

In one embodiment, a first chamber supply valve 84 may be flow coupled to first chamber supply line 64 to control the flow of gas from MFC 30 to holding chamber 40. Chamber supply valve 84 is controlled by PLC 20 via valve control line 184. Chamber supply valve 84 may be a solenoid valve. Sensor signals from chamber supply valve 84, may provide signals to PLC 20, also via valve control line 184, regarding the open or closed status of valve 84 or its degree of opening or closing.

The inclusion of first chamber supply valve 84 in apparatus 100 is particularly preferred when apparatus 100 includes more than one holding chamber. A multi-chambered embodiment of apparatus 100 is shown in FIG. 2. In addition to the components described above with reference to a single chambered embodiment of apparatus 100, a multi-chambered embodiment further includes a second holding chamber 50.

Second holding chamber 50 may be the same as first holding chamber 40. Indeed, in FIG. 2, components of second holding chamber 50 follow the same numbering pattern and perform the same functions as components of first holding chamber 40. Thus, second holding chamber 50 is shown with a gas supply port 52, a gas exit port 54, a locking latch 56, a locking latch sensor 57 and a pressure sensor 58. Control lines 156, 157, 158 allow PLC 20 to send and/or receive signals from latch 56 and sensors 57 and 58, respectively, as described above with respect to latch 46 and sensors 47 and 48 of first holding chamber 40.

Alternatively, second holding chamber 50 may be similar to first holding chamber 40, but be sized to accommodate larger or smaller animals or more or less animals than first holding chamber. Optionally, second or subsequent holding chambers may differ from first holding chamber 40. For example, any of the holding chambers could be cylindrical to eliminate corners and facilitate post process cleaning and sanitation of the chambers. As non-limiting examples, materials for making the holding chambers could include polymers, stainless steels, aluminums, glasses or a combination thereof. In another aspect, the chamber may have a removable or hinged bottom to facilitate the removal of the bodies of the euthanitized animals at the conclusion of the euthanitizing operation. Further, gas hose connections to the gas supply port and the gas exit port may be quick disconnect-types.

Holding chamber 50 is flow coupled to gas flow distribution system 60 downstream of MFC 30. Specifically, euthanitizing gas from MFC 30 flows into holding chamber 50 via gas supply port 52 and chamber supply line 74. Euthanitizing gas exits holding chamber 50 via gas exit port 54 and second chamber gas evacuation line 76. Second chamber gas evacuation line 76 is flow coupled to gas evacuation system 70. As with first flow chamber 40, in an alternative embodiment, a second chamber gas purge line 78 may be provided between holding chamber 40 and gas evacuation system 70. Second chamber gas purge line 78 may be installed in parallel with second chamber evacuation line 76. In one embodiment, gas flow lines (74, 76, 78) that flow couple second holding chamber 50 into gas flow distribution system 60 may be distinguished from those gas flow lines (64, 66, 68) that flow couple first holding chamber 40 into gas flow distribution system 60. For example, the size of the hoses or the hose connectors for chamber 50 could differ from those of chamber 40. Optionally, the hoses could be color-coded.

Valves for controlling the flow of euthanitizing gas into and out of second holding chamber 50 may be provided. Thus, in one embodiment, a second chamber supply valve 94 may be flow coupled to second chamber supply line 74 to control the flow of gas from MFC 30 to second holding chamber 50. Second chamber supply valve 94, which may be a solenoid valve, is controlled by PLC 20 via valve control line 194. Sensor signals from second chamber supply valve 94, may provide signals to PLC 20, also via valve control line 194, regarding the open or closed status of valve 94 or its degree of opening or closing. Evacuation valve 96 may be flow coupled to second chamber gas evacuation line 76 to control the flow of gas from second holding chamber 50 to gas evacuation system 70. Evacuation valve 96, which may be a solenoid valve, is controlled by PLC 20 via valve control line 196. Evacuation valve 96 may also provide signals to PLC 20, also via valve control line 196, regarding the open or closed status of valve 96 or its degree of opening or closing. A second chamber purge valve 98 may be flow coupled to second chamber gas purge line 78 to provide a pressure release safety mechanism to prevent excessive pressure in holding chamber 50. In one aspect, purge valve 98 may be a spring-loaded check valve.

In a multi-chamber embodiment, the two or more holding chambers may be used at the same time or sequentially, or any combination thereof for apparatus having more than two holding chambers. During sequential operation, PLC 20 may allow for one chamber to be operated while another chamber is off-line, for example, while being sanitized. The use of multiple chambers allows more animals to be processed for any given time period.

Figure 3:
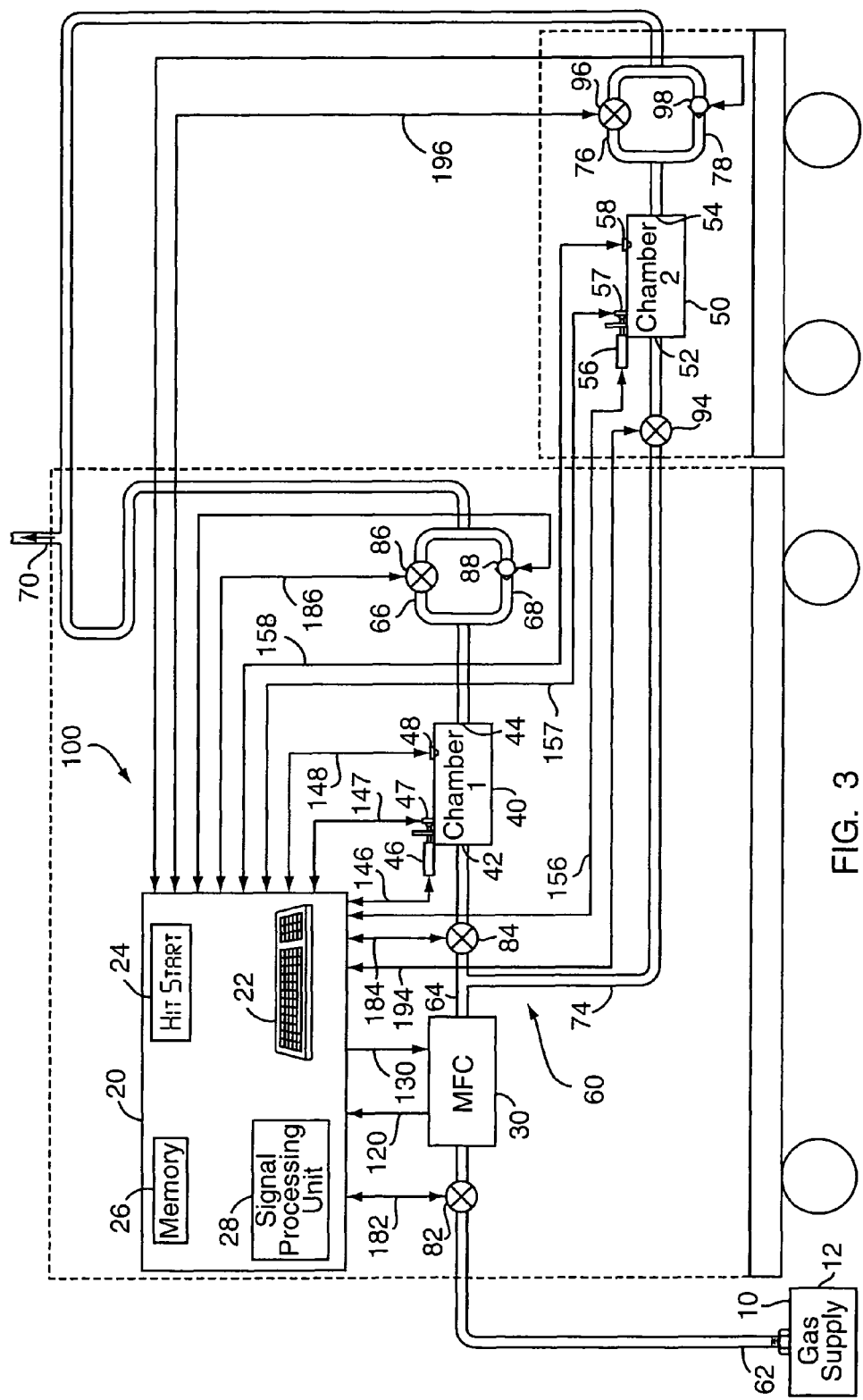
FIG. 3 is a schematic representation of a further embodiment of the apparatus of the present invention.

In a further embodiment of the present invention as best shown in FIG. 3, apparatus 100 is configured as a mobile unit 200 that includes PLC 20, MFC 30 and gas flow distribution system 60. These components of mobile unit 200 could be mounted on one or more carts or transport vehicles 210a, 210b. On the same or on additional carts, or as part of a fixed or stationary system, gas supply system 10 and/or gas evacuation system 70 may be provided. Mobile unit 200 may include one or more mobile holding chambers mounted on the same cart as PLC 20 and MFC 30 or on other carts. Alternatively, mobile unit 200 may be positioned adjacent to and flow coupled to one or more stationary holding chambers.

In one embodiment, apparatus 100 has an animal holding chamber or euthanitizing chamber 40 that is post-charged with gas. Our data show that post-charging the chamber with gas created less discomfort for the animal during the euthanasia process. The apparatus 100 and method were developed to be automated and to reduce as much interaction by personnel as possible. The use of a Programmed or Programmable Logic Controller (PLC) 20 and Mass Flow Controller (MFC) 30 provides greater control and accuracy when dispensing the gas into the chamber. In one embodiment, operator output interface 24 of PLC 20 has a graphical display screen that provides a display to inform the personnel using the equipment of the various stages during the process. In another embodiment, access to PLC 20 programming, for example, to input program changes, is password protected so that when the system is setup, only authorized personnel can make changes.

The following will describe the system and discuss the procedure that is followed when operating the system according to one embodiment.

In accordance with one aspect of the embodiment, there is provided an apparatus and method for using MFC 30 with the use of PLC 20 to provide a constant flow rate of gas under a specific pressure for a specified time. One type of gas is carbon dioxide.

PLC 20 can be programmed to provide various cycles, which are designed to provide the proper flow rate for each animal species. In one aspect of the embodiment, the animal is a rodent. In another aspect of the embodiment, the program allows for a two-stage flow rate cycle. In this cycle the animal progresses from the upright to unconscious state during the first low gas flow stage of the cycle and then to a terminal state during the second increased flow stage. This programming is intended to reduce the distress felt by the animal by allowing it to be anesthetized prior to the initiation of the second stage flow.

A keypad for the operator input interface 22 and a graphical display screen for the operator output interface 24 of the system are designed to be simple for personnel to operate properly. The PLC programming allows an operator to adjust flow rates and timer functions to accommodate various sizes of chambers and different species of animals. PLC 20 and MFC 30 have been designed to accommodate both carbon dioxide ($CO_2$) and other gases such as argon blends or carbon dioxide:oxygen mixtures.

In one aspect, the enclosure for PLC 20 is a moisture-proof NEMA 4 cabinet constructed of stainless steel. The cabinet may be mounted to the wall. The door to the cabinet may be secured to prevent tampering with the internal control systems. This setting is merely exemplary and should not be considered as limiting in any way.

In one aspect, PLC 20 is menu driven and provides a graphical display to inform the personnel using the equipment of the various stages during the process. This display provides written instructions to inform the operator of each step in the process. This display also monitors and checks each stage of the process and will alarm the operator if there is any malfunction. PLC 20 provides all the timer and flow rate functions for this process. PLC 20 allows the system to have multiple phases that provide variable flow rates and exposure times for each species.

In one aspect, $CO_2$ gas is supplied from a pressurized cylinder 12. The flow of the gas is controlled by MFC 30 to maintain the proper flow rate. A closed-loop feedback system between PLC 20 and MFC 30 maintains a desired flow rate. A gas supply valve 82 may close or partially close the gas supply line 62 when the PLC 20 determines the desired flow rate has been exceeded. Gas supply valve 82 may be a solenoid valve controlled by PLC 20.

In another aspect, a purge valve 86 was installed in a first gas evacuation line 66 to allow the system to evacuate the gas after the operation is completed thereby emptying the chamber of euthanitizing gas prior to its next use. A pressure relief valve 88 may be included in a second gas evacuation line 68 as a safety precaution to prevent over pressurizing the animal holding chamber 40.

In a further aspect, a red light may be located on the top of the controller cabinet to notify the operator of any malfunctions or, for example, when the $CO_2$ cylinder is empty or low. In such case, PLC 20 may provide a graphical text message to the operator with details of the malfunction.

According to another aspect of the embodiment, animal holding chamber 40 was designed to accommodate both a gas supply port 42 located so that the animals cannot feel the gas flow and a gas exhaust port 44 to evacuate all gases before loading the next group of animals. Gas supply port 42 may be located on a sidewall of chamber 40 in the upper three-quarters of the chamber. This location is meant to provide a better mixing of the gas, since $CO_2$ (a commonly used euthanitizing gas) sinks, and to mitigate the gas from blowing directly onto the animals. Gas exhaust port 44 may be located approximately one inch from the floor and runs the width of the side to allow for rapid evacuation of the gas from within the chamber during the purge cycle. In one aspect, the gas is evacuated directly into a house vacuum system to minimize any exposure to the operator.

As non-limiting examples and for purposes of demonstration, two sizes of chambers 40 are described. The smaller size chamber (approximately 0.75 cubic feet) is capable of handling 1-3 rats while the larger chamber (approximately 2.5 cubic feet) is designed to handle larger groups of rats. Alternatively, a large rodent cage may be placed inside the large chamber, thereby reducing the handling of the rodents and helping to reduce the stress to the animals. Although particular reference has been made above to the size of the chambers and the euthanasia of rats, the same technique using the same method and apparatus can be used for the euthanasia of a variety of other small animals, including but not limited to mice, gerbils, guinea pigs, chicks and others in various chamber sizes.

In one aspect, animal holding chambers 40 are constructed of materials that allow for easy sanitation. Examples include but are not limited to acrylic and polycarbonate. In a preferred aspect, black acrylic makes up three sides of the chamber to obstruct viewing for both animals and individuals not involved in the euthanasia process. The top and front of the chamber is made from clear polycarbonate to allow adequate visibility for the person performing the euthanasia process. In another aspect, a lid 45 of holding chamber 40 slides so that it is easily removed for proper sanitizing. Lid 45 incorporates electronic locking latch 46. Latch 46 includes a sensor 47 to signal the PLC 20 that the chamber 40 is latched or unlatched and thus ready to be charged at the beginning of an operational cycle or purged at the end of the cycle, respectively.

In one aspect, all gas supply lines are ⅜" ID braided chemical grade hoses with ⅝" OD hose connections. These hoses allow a consistent gas flow and minimize the possibility of the gas freezing the lines during the process.

Example Embodiment Of Euthanasia Chamber Operation

This example is designed for small animals (rodents). As an initial step, the operator selects the appropriate species cycle when performing this procedure. The cycles are designed to provide the proper flow rate to allow the animal to progress from the upright to the unconscious or anesthetized state and then increase the flow rate to cause the animal to progress to the terminal state. In this example, the chamber is filled with gas only after the animals have been placed into the chamber (post-filled operation).

The system operates at 20 lbs. of $CO_2$ gas supply. When changing the $CO_2$ cylinder personnel should ensure the pressure gauge reads 20 psi.

The following are sample directions for personnel who use the system:
1. Place an absorbable liner in bottom of chamber (if using the large chamber, the cage may be placed directly into the chamber).
2. Place animals in the empty chamber.
3. Slide lid to close it tightly
4. Press "Start" button on controller (lid will lock)
5. Select proper cycle for the species (gas will start to flow)
   (1) Mice
   (2) Rats
   (3) Guinea Pig
   (4) Other
6. When the cycle is completed, slide the lid open, observe animals and verify the lack of respiration and a heartbeat on each animal.
7. If additional exposure is required, slide the lid closed and press the left arrow button on controller to provide one minute (or other selected time period) of additional gas flow. This step can be repeated an unlimited number of times.
8. Again slide the lid open. If there is no sign of respiration and no heartbeat, remove animals from the chamber and place them in the appropriate container.
9. Press "enter" on the controller to purge chamber (lid must be unlocked).
10. Remove soiled liners and euthanitized animals (or the cage) and sanitize chamber with the appropriate agent.

This apparatus has simplified and standardized the issue of how much carbon dioxide or other euthanitizing gas should be administered to various animal species and how long the exposure time should be. In addition, this apparatus allows for faster and more efficient processing of large groups of animals, particularly when more than one holding chamber is utilized. Further, this apparatus provides a compact and flexible mobile system for properly euthanizing a large variety of animals at more than one location with a research facility.

Although the present invention has been described in with respect to the detailed embodiments presented herein, it will be understood by those skilled in the art that various changes in form or detail thereof may be made without departing from the spirit and scope of the present invention.

What is claimed is:

1. An apparatus for the euthanasia of animals in at least one animal holding chamber using a euthanitizing gas, the apparatus comprising:
    a programmed controller configured to initiate a flow of the euthanitizing gas and pre-programmed with multiple schedules of instructions based on at least one condition of use of the apparatus, including the type or size of the animals and the size or number of chambers;
    a mass flow controller configured to be flow coupled to a source of the euthanitizing gas; and
    a first animal holding chamber flow coupled to the mass flow controller;
    wherein the controller is programmed for a two-stage flow rate euthanasia cycle, in which a first stage controls the flow controller to provide an anesthetizing flow of the euthanizing gas, and a second stage controls the flow controller to provide a euthanizing flow of the euthanizing gas that is greater than the flow during the first stage.

2. The apparatus of claim 1, further including a second animal holding chamber flow coupled to the mass flow controller to receive euthanizing gas when the first animal holding chamber receives euthanizing gas.

3. The apparatus of claim 1, wherein said programmed controller is configured to control said flow rate of the euthanitizing gas into the first animal holding chamber such that said flow rate changes as a function of time.

4. The apparatus of claim 1, wherein said programmed controller is configured to send signals to, and receive signals from, said mass flow controller.

5. The apparatus of claim 1, further including
    a supply valve configured to stop the flow of the euthanitizing gas from entering said mass flow controller, said supply valve located upstream of said mass flow controller.

6. The apparatus of claim 1, further including a first chamber valve configured to stop the flow of the euthanitizing gas from entering said first animal holding chamber, said first chamber valve located downstream of said mass flow controller and upstream of said first animal holding chamber.

7. The apparatus of claim 1, further including a first purge valve configured to stop the flow of the euthanitizing gas exiting said first animal holding chamber, said first purge valve located downstream of said first animal holding chamber.

8. The apparatus of claim 7, further including a first pressure release valve configured to stop the flow of the euthanitizing gas from exiting said first animal holding chamber, said first pressure release valve located downstream of said first animal holding chamber.

9. The apparatus of claim 1, further including a first pressure release valve configured to stop the flow of the euthanitizing gas from exiting said first animal holding chamber, said first pressure release valve located downstream of said first animal holding chamber.

10. The apparatus of claim 1, further including
    a supply valve configured to stop the flow of the euthanitizing gas from entering said mass flow controller, said supply valve located upstream of said mass flow controller; and
    a first purge valve configured to stop the flow of the euthanitizing gas from exiting said first animal holding chamber, said first purge valve located downstream of said first animal holding chamber,
    wherein said supply valve and said first purge valve are solenoid valves, and
    wherein the operation of said solenoid valves is controlled by said programmed controller.

11. The apparatus of claim 1, wherein said first animal holding chamber includes a locking latch and a locking latch sensor, and wherein further said programmed controller is pre-programmed to receive signal from said locking latch sensor to initiate and implement one of said multiple schedules.

12. The apparatus of claim 1 wherein said programmed controller is programmable and wherein said programmed controller is protected from unauthorized programming.

13. The apparatus of claim 1, wherein said programmed controller includes pre-programmed schedules of instructions for euthanitizing more than one type of animal.

14. The apparatus of claim 1, including a second animal holding chamber coupled to said flow controller, wherein said multiple schedules include pre-programmed instructions for controlling the flow of the euthanitizing gas into both said first and said second animal holding chambers and for euthanitizing more than one type of animal.

15. The apparatus of claim 13, wherein said programmed controller includes pre-programmed instructions for utilizing a euthanitizing gas having a carbon dioxide component.

16. The apparatus of claim 14, wherein said programmed controller is pre-programmed to control a first flow rate of the euthanitizing gas into said first animal holding chamber and a second flow rate of the euthanitizing gas into said second animal holding chamber.

17. The apparatus of claim 16, wherein said programmed controller is pre-programmed to control said first and second flow rates such that said first rate changes as a first function of time and said second flow rate changes as a second function of time.

18. The apparatus of claim 16, wherein said programmed controller is pre-programmed to control said first and second flow rates such that said first flow rate is zero when said second flow rate is non-zero.

19. The apparatus of claim 16, further comprising:
a first chamber valve pre-programmed to stop the flow of the euthanitizing gas from entering said first animal holding chamber, said first chamber valve located downstream of said mass flow controller and upstream of said first animal holding chamber; and
a second chamber valve pre-programmed to stop the flow of the euthanitizing gas from entering said second animal holding chambers, said second animal holding chamber having a valve located downstream of said mass flow controller and upstream of the second animal holding chamber.

20. The apparatus of claim 16, further including
a first purge valve pre-programmed to stop the flow of the euthanitizing gas from exiting said first animal holding chamber, said first purge valve located downstream of said first animal holding chamber; and
a second purge valve pre-programmed to stop the flow of the euthanitizing gas from exiting said second animal holding chamber, said second purge valve located downstream of said second animal holding chamber.

21. The apparatus of claim 20, further including
a first pressure release valve pre-programmed to stop the flow of the euthanitizing gas from exiting said first animal holding chamber, said first pressure release valve located downstream of said first animal holding chamber; and
a second pressure release valve pre-programmed to stop the flow of the euthanitizing gas from exiting said second animal holding chamber, said second pressure release valve located downstream of said second animal holding chamber.

22. The apparatus of claim 16, further including
a supply valve pre-programmed to stop the flow of the euthanitizing gas, said supply valve located upstream of said mass flow controller;
first and second chamber valves pre-programmed to stop the flow of the euthanitizing gas, said first chamber valve located downstream of said mass flow controller and upstream of said first animal holding chamber, and said second chamber valve located downstream of said mass flow controller and upstream of said second animal holding chamber; and
first and second purge valves pre-programmed to stop the flow of the euthanitizing gas, said first purge valve located downstream of said first animal holding chamber and said second purge valve located downstream of said second animal holding chamber,
wherein said supply valve, said first and second chamber valves, and said first and second purge valves are solenoid valves, and wherein the operation of said solenoid valves is pre-programmed by said programmed controller.

23. A method for the euthanasia of animals utilizing an apparatus having a pre-programmed controller storing instructions including at least a first flow rate schedule for supplying euthanitizing gas, a flow controller flow coupled to a source of a euthanitizing gas, and at least a first animal holding chamber flow coupled to the flow controller, the first animal holding chamber holding animals, the method comprising the steps of:
selecting a first flow rate schedule of euthanitizing gas flow;
initiating a first flow of euthanitizing gas according to said first flow rate schedule into the first animal holding chamber; and
controlling a first flow rate of euthanitizing gas according to said first flow rate schedule into the first animal holding chamber;
exposing the animal to the euthanizing gas for sufficient time to euthanize the animal in the animal chamber;
automatically opening an inlet to the animal chamber to allow air to flow into the animal chamber after the animal is euthanized; and
initiating exhaust to draw the euthanizing gas out of the animal chamber and air into the animal chamber through the inlet after the animal is euthanized.

24. The method of claim 23, wherein said schedule controlling the first flow rate of euthanitizing gas includes instructions for sending a signal from the pre-programmed controller to the flow controller.

25. The method of claim 24, wherein controlling the first flow rate of euthanitizing gas further includes sending a signal from the flow controller to the pre-programmed controller.

26. The method of claim 23, further including the steps of:
selecting a second flow rate schedule of euthanitizing gas flow;
initiating a second flow of euthanitizing gas according to said second flow rate schedule into a second animal holding chamber; and
controlling a second flow rate of euthanitizing gas according to said second flow rate schedule into the second animal holding chamber.

27. The method of claim 26, wherein the step of controlling comprises controlling said first flow rate of euthanitizing gas into said first animal holding chamber at least partially concurrently with controlling said second flow rate of euthanitizing gas into said second animal holding chamber.

28. The method of claim 23, wherein said first flow rate varies as a function of time.

29. The method of claim 23 wherein prior to the step of initiating the first flow of euthanitizing gas, the method includes the step of providing a signal to the pre-programmed controller indicating that the first animal holding chamber is closed.

30. An apparatus for the euthanasia of animals using a euthanitizing gas, the apparatus comprising:
a pre-programmed controller having multiple schedules of instructions adapted to be individually selected for implementation, and configured to initiate a flow of the euthanitizing gas and implement the selected instructions;
a flow controller configured to be flow coupled to a source of the euthanitizing gas; and
an animal holding chamber flow coupled to the flow controller;

wherein the flow controller is operable to automatically control the flow of euthanitizing gas to the animal holding chamber in response to instructions in the selected schedule received from the pre-programmed controller wherein the instructions provide a two-stage flow rate that varies the flow rate as a function of time, the first stage of the two-stage flow rate being an anesthetizing stage, and the second stage of the two-stage flow rate being the termination stage.

31. The apparatus of claim 30 wherein the flow controller comprises an automatically actuatable valve.

32. The apparatus of claim 30 wherein the pre-programmed controller comprises a schedule of pre-programmed instructions for controlling the flow of euthanitizing gas according to a predefined profile.

33. The apparatus of claim 30 wherein the pre-programmed instructions include information regarding the duration of time euthanitizing gas is to flow into the animal holding chamber at a first flow rate prior to changing the flow of euthanitizing gas to a second flow rate.

34. The apparatus of claim 33 wherein the second flow rate is zero.

35. An apparatus for the euthanasia of animals, comprising:
an animal holding chamber;
a gas inlet for supplying a flow of euthanizing gas from a reservoir of euthanizing gas to the animal holding chamber;
an air inlet for allowing air into the euthanizing chamber;
an exhaust outlet for exhausting the euthanizing gas from the chamber;
a fluid controller operable to control the flow of fluid through the gas inlet;
an air inlet controller operable to retain the air inlet in a closed condition during introduction of the gas into the chamber and to automatically open the air inlet to allow the gas to be exhausted from the chamber;
a controller operable to control the fluid controller in response to a preprogrammed schedule for varying the flow of euthanizing gas, wherein the controller controls the flow of euthanizing gas in a multi-stage flow rate as a function of time.

36. The apparatus of claim 35 wherein the preprogrammed schedule comprises a first flow of euthanizing gas at a first flow rate for an anesthetization time period.

37. The apparatus of claim 36 wherein in response to the time controlled preprogrammed schedule the controller changes the flow rate of the euthanizing gas to a second flow rate.

38. The apparatus of claim 37 wherein the second flow rate is non-zero.

39. The apparatus of claim 37 wherein the preprogrammed schedule comprises the second flow rate for a euthanization time period.

40. The apparatus of claim 35 wherein the controller is operable to provide control signals to automatically evacuate the euthanizing gas from the chamber.

41. The apparatus of claim 35 wherein the controller is operable to control the first fluid controller to provide a first flow rate of euthanizing gas into the chamber for a specified time.

42. The apparatus of claim 35 wherein the controller is operable to control the first fluid controller to provide the first flow rate at a predetermined pressure during the specified time.

43. The apparatus of claim 35 wherein the preprogrammed schedule includes a first gas flow at a rate for anesthetizing an animal in the chamber to an unconscious state and a second gas flow rate greater than the first flow rate to euthanize the animal.

44. The apparatus of claim 35 wherein the air inlet comprises an opening into the chamber and the air inlet controller comprises a closure sealing the opening.

45. The apparatus of claim 35 wherein the air inlet controller comprises an actuator operable between an open and closed position to actuate the closure from a sealed position to an unsealed position.

46. A method for euthanizing animals comprising the steps of:
providing a chamber for receiving an animal;
placing an animal into the chamber;
initiating a flow of euthanizing gas to the chamber controlling the flow of euthanizing gas into the chamber according to a pre-programmed schedule to euthanize the animal in the chamber, wherein the flow of euthanizing gas is controlled in multible stages as a function of time;
initiating an exhaust after the animal is euthanized to purge the euthanizing gas from the chamber.

47. The method of claim 46 wherein the step of controlling the flow of euthanizing gas comprises providing a signal to an electronically actuable fluid controller controlling the flow of euthanizing gas to the chamber.

48. The method of claim 46 comprising the step of closing the chamber to impede the flow of euthanizing gas out of the chamber prior to the step of initiating an exhaust.

49. The method of claim 46 comprising the step of opening an inlet to the chamber to allow a flow of air into the chamber after the animal is euthanized.

* * * * *

UNITED STATES PATENT AND TRADEMARK OFFICE
CERTIFICATE OF CORRECTION

PATENT NO.        : 9,044,027 B2
APPLICATION NO.   : 11/301146
DATED             : June 2, 2015
INVENTOR(S)       : Howard Mosher Page 1 of 1

It is certified that error appears in the above-identified patent and that said Letters Patent is hereby corrected as shown below:

IN THE CLAIMS

Column 16, claim 46, line 32, "chamber controlling"
should read -- chamber; controlling --;

Column 16, claim 46, line 36, "multible"
should read -- multiple --.

Signed and Sealed this
Eighth Day of December, 2015

Michelle K. Lee
*Director of the United States Patent and Trademark Office*